US012617359B2

(12) United States Patent
Figueroa Tamayo et al.

(10) Patent No.: US 12,617,359 B2
(45) Date of Patent: May 5, 2026

(54) CLAMP ASSEMBLY FOR VEHICLE BATTERY CONFIGURED TO INTERFACE WITH LOCKING LUG NUT KEY

(71) Applicant: Ford Global Technologies, LLC, Dearborn, MI (US)

(72) Inventors: Miguel Ángel Figueroa Tamayo, Naucalpan (MX); Oscar Xavier Hurtado Reynoso, Alvaro Obregon (MX); Luis Angel Mota Hernández, Ecatepec (MX); Saulo Ivann García Vega, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 18/613,344

(22) Filed: Mar. 22, 2024

(65) Prior Publication Data

US 2025/0296520 A1    Sep. 25, 2025

(51) Int. Cl.
| | |
|---|---|
| *B60R 16/04* | (2006.01) |
| *B60L 50/64* | (2019.01) |
| *F16B 23/00* | (2006.01) |
| *H01M 50/262* | (2021.01) |

(52) U.S. Cl.
CPC ........... *B60R 16/04* (2013.01); *F16B 23/003* (2013.01); *H01M 50/262* (2021.01); *B60L 50/64* (2019.02); *H01M 2220/20* (2013.01)

(58) Field of Classification Search
CPC .... B60R 16/04; F16B 23/003; H01M 50/262; H01M 2220/20; B60L 50/64
See application file for complete search history.

(56) References Cited

U.S. PATENT DOCUMENTS

| | | | | | |
|---|---|---|---|---|---|
| 2,791,898 A | * | 5/1957 | Pegg | ................... | H01M 50/264 |
| | | | | | 180/68.5 |
| 2,947,373 A | * | 8/1960 | Wilson | ................ | H01M 50/262 |
| | | | | | 180/68.5 |
| 3,498,400 A | * | 3/1970 | Hysmith | ................. | B60R 16/04 |
| | | | | | 180/68.5 |
| 3,752,254 A | * | 8/1973 | Carley | ................... | B60R 16/04 |
| | | | | | 180/68.5 |
| 3,826,115 A | * | 7/1974 | Davis | ..................... | B60R 16/04 |
| | | | | | 180/68.5 |
| 4,191,034 A | * | 3/1980 | Froess | .................... | B60R 16/04 |
| | | | | | 180/68.5 |
| 4,249,403 A | * | 2/1981 | Littlejohn | ............... | B60R 16/04 |
| | | | | | 70/230 |

(Continued)

FOREIGN PATENT DOCUMENTS

| | | |
|---|---|---|
| CN | 105774753 A | 7/2016 |
| CN | 211974646 U | 11/2020 |

(Continued)

*Primary Examiner* — Jacob B Meyer
(74) *Attorney, Agent, or Firm* — Vichit Chea; Carlson, Gaskey & Olds, P.C.

(57) ABSTRACT

A clamp assembly configured to hold a battery in place is configured to interface with a locking lug nut key. The clamp assembly provides a balance between preventing unintended movement or displacement of the battery, without overly complicating the process of tightening or loosening the clamp assembly. Further, a number of component parts is reduced, as separate keys are not required for the locking lug nuts and the clamp assembly.

20 Claims, 3 Drawing Sheets

(56)     References Cited

U.S. PATENT DOCUMENTS

| | | | | | |
|---|---|---|---|---|---|
| 4,495,787 | A | * | 1/1985 | Comstock | B60R 16/04 292/181 |
| 4,535,863 | A | * | 8/1985 | Becker | B60R 16/04 180/68.5 |
| 5,052,198 | A | * | 10/1991 | Watts | B60R 16/04 180/68.5 |
| 5,167,395 | A | * | 12/1992 | Pearman | H01M 50/249 248/500 |
| 5,904,383 | A | * | 5/1999 | van der Wal | B63B 17/00 70/229 |
| 6,230,834 | B1 | * | 5/2001 | Van Hout | B60R 16/04 180/68.5 |
| 7,726,427 | B2 | * | 6/2010 | Picavet | B60R 16/04 180/68.5 |
| 9,540,849 | B2 | * | 1/2017 | Renfro | E05B 73/00 |
| 10,266,136 | B2 | * | 4/2019 | Toyoda | H01M 50/264 |
| 10,457,130 | B2 | * | 10/2019 | Bengtsson | B60L 50/66 |
| 2025/0296520 | A1 | * | 9/2025 | Figueroa Tamayo | B60R 16/04 |

FOREIGN PATENT DOCUMENTS

| | | | | | |
|---|---|---|---|---|---|
| CN | 214589141 | U | | 11/2021 | |
| CN | 215043281 | U | | 12/2021 | |
| DE | 102025110505 | A1 | * | 9/2025 | B60R 16/04 |
| FR | 2806531 | A1 | * | 9/2001 | H01M 50/262 |

* cited by examiner

CLAMP ASSEMBLY FOR VEHICLE BATTERY CONFIGURED TO INTERFACE WITH LOCKING LUG NUT KEY

TECHNICAL FIELD

This disclosure relates to a clamp assembly for a battery of a motor vehicle. The clamp assembly is configured to interface with a locking lug nut key.

BACKGROUND

Motor vehicles are known to include batteries located under the hood of the motor vehicle, for example. Such batteries typically include a voltage level of 12 Volts, and are configured to power auxiliary systems and/or facilitate starting of an engine of the motor vehicle. Some motor vehicles include clamp assemblies configured to stabilize the battery and hold the battery in place.

SUMMARY

In some aspects, the techniques described herein relate to a motor vehicle, including: a battery; and a clamp assembly configured to hold the battery in place, wherein the clamp assembly is configured to interface with a locking lug nut key.

In some aspects, the techniques described herein relate to a motor vehicle, wherein the locking lug nut key is also configured to interface with a locking lug nut of the motor vehicle.

In some aspects, the techniques described herein relate to a motor vehicle, wherein: the clamp assembly includes a bolt, and a head of the bolt is configured to interface with the locking lug nut key.

In some aspects, the techniques described herein relate to a motor vehicle, wherein: the head of the bolt includes an inner wall providing a cavity, and the inner wall exhibits a pattern configured to interface with the locking lug nut key.

In some aspects, the techniques described herein relate to a motor vehicle, wherein the pattern of the inner wall includes one or more of splines, grooves, notches, lobes, points, projections, and indentations.

In some aspects, the techniques described herein relate to a motor vehicle, wherein an outer wall of the head of the bolt is substantially circular.

In some aspects, the techniques described herein relate to a motor vehicle, wherein: the locking lug nut key includes a first section and a second section, the first section includes a projection exhibiting a negative of the pattern, the projection is configured to project into the cavity of the head of the bolt and to interface with the inner wall of the head of the bolt, and when the projection projects into the cavity of the head of the bolt and interfaces with the inner wall of the head of the bolt, the bolt is configured to rotate with rotation of the locking lug nut key.

In some aspects, the techniques described herein relate to a motor vehicle, wherein an outer wall of the second section is configured to interface with a wrench.

In some aspects, the techniques described herein relate to a motor vehicle, wherein an outer wall of the second section is configured to interface with a standard socket.

In some aspects, the techniques described herein relate to a motor vehicle, wherein: the clamp assembly also includes a first jaw and a second jaw, and the bolt is configured to interface with the first jaw and the second jaw such that the clamp assembly selectively applies force to the battery.

In some aspects, the techniques described herein relate to a motor vehicle, wherein: the battery includes a projection, and the bolt is configured to interface with the first jaw and the second jaw to selectively apply force to the projection.

In some aspects, the techniques described herein relate to a motor vehicle, wherein: the first jaw includes a recess in a surface facing away from the second jaw, and the recess is configured to receive the head of the bolt such that the head of the bolt does not project beyond the surface of the first jaw in a direction away from the second jaw.

In some aspects, the techniques described herein relate to a motor vehicle, wherein the second jaw is configured to contact a battery tray and is located on an opposite side of the battery tray as the first jaw.

In some aspects, the techniques described herein relate to a motor vehicle, wherein the battery is a 12 Volt battery.

In some aspects, the techniques described herein relate to a clamp assembly for holding a vehicle battery in place, including: a first jaw; a second jaw; a bolt configured to interface with the first and second jaw and further configured to selectively tighten and loosen the clamp assembly, wherein the bolt is configured to interface with a locking lug nut key.

In some aspects, the techniques described herein relate to a clamp, wherein: a head of the bolt includes an inner wall providing a cavity, the inner wall exhibits a pattern configured to interface with the locking lug nut key the locking lug nut key includes a projection exhibiting a negative of the pattern, the projection is configured to project into the cavity of the head of the bolt and to interface with the inner wall of the head of the bolt, and when the projection projects into the cavity of the head of the bolt and interfaces with the inner wall of the head of the bolt, the bolt is configured to rotate with rotation of the locking lug nut key.

In some aspects, the techniques described herein relate to a method, including: tightening or loosening a clamp assembly using a locking lug nut key of a motor vehicle, wherein the clamp assembly is configured to hold a battery of the motor vehicle in place.

In some aspects, the techniques described herein relate to a method, wherein: the clamp assembly includes a first jaw, a second jaw, and a bolt configured to selectively tighten and loosen the first jaw relative to the second jaw, and the bolt is configured to interface with the locking lug nut key.

In some aspects, the techniques described herein relate to a method, wherein: a head of the bolt includes an inner wall providing a cavity, the inner wall exhibits a pattern configured to interface with the locking lug nut key, the locking lug nut key includes a projection exhibiting a negative of the pattern, the projection is configured to project into the cavity of the head of the bolt and to interface with the inner wall of the head of the bolt, and the tightening or loosening step is performed when the projection projects into the cavity of the head of the bolt and interfaces with the inner wall of the head of the bolt.

In some aspects, the techniques described herein relate to a method, further including: tightening or loosening a locking lug nut of the motor vehicle using the locking lug nut key.

BRIEF DESCRIPTION OF THE DRAWINGS

In FIG. 1, a hood of the motor vehicle is open.

DETAILED DESCRIPTION

This disclosure relates to a clamp assembly for a battery of a motor vehicle. The clamp assembly is configured to interface with a locking lug nut key. This disclosure provides a balance between preventing unintended movement or displacement of the battery, without overly complicating the process of tightening or loosening the clamp assembly. These and other benefits will be appreciated from the following description.

Figure 1:
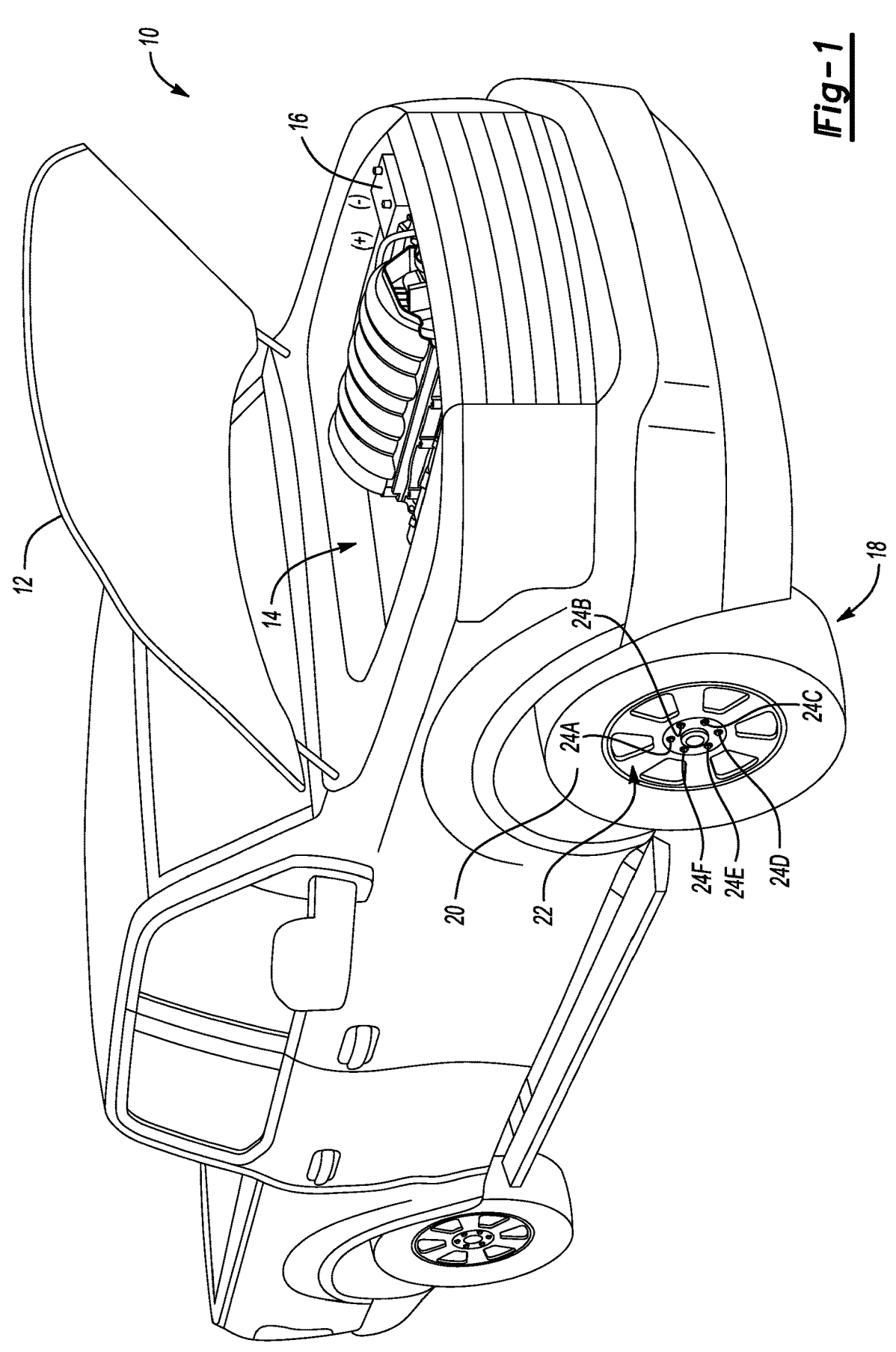
FIG. 1 is a front perspective view of an example motor vehicle.

Referring to the drawings, FIG. 1 is a front perspective view of an example motor vehicle 10, which in this example is a pickup truck. While a pickup truck is shown, this disclosure extends to other vehicle types.

In FIG. 1, a hood 12 of the motor vehicle 10 is open. The motor vehicle 10 in this example includes an internal combustion engine 14 and a battery 16. In this example, the battery 16 is a 12 Volt battery configured to power auxiliary systems of the motor vehicle 10, and/or facilitate starting of the internal combustion engine 14 of the motor vehicle 10.

While the battery 16 is arranged under the hood 12 in this example, the battery 16 could be arranged in another location. Further, while the motor vehicle 10 is shown with an internal combustion engine 14, it should be understood that this disclosure extends to electrified vehicles, including hybrid electric vehicles. This disclosure also extends to other electrified vehicles, such as battery electric vehicles (BEVs), that may include a battery, such as a 12 Volt battery, configured to power various auxiliary systems, for example.

The motor vehicle 10 further includes four wheel assemblies. With reference to one of the wheel assemblies 18, each wheel assembly includes a tire 20 and a hub 22. The hub 22 is attached to the vehicle attachment point, which may be an axle, via a plurality of lugs 24A-24F. In this example, all lugs 24A-24E are configured to interface with a standard socket, such that a user can rotate the lugs 24A-24E by providing a standard socket over the lugs 24A-24E and rotating the socket and lug 24A-24E using a tool, such as a socket wrench, breaking bar, power drill, etc., interfaced with the standard socket. The lug 24F, however, is a locking lug nut in this disclosure, and is not configured to interface with a standard socket. Instead, the locking lug nut 24F is configured to interface with a locking lug nut key. The locking lug nut key is, in turn, configured to interface with a tool. The locking lug nut key is unique to the motor vehicle 10, in this example, and may be provided by a manufacturer of the motor vehicle 10 to an owner of the motor vehicle 10. The locking lug nut 24F makes it difficult for anyone without the locking lug nut key to remove the locking lug nut 24F, and in turn the wheel assembly 18, from the motor vehicle 10. While only one wheel assembly has been described, each wheel assembly can be arranged similarly, and in particular each wheel assembly may include a locking lug nut similar to locking lug nut 24F.

Figure 2:
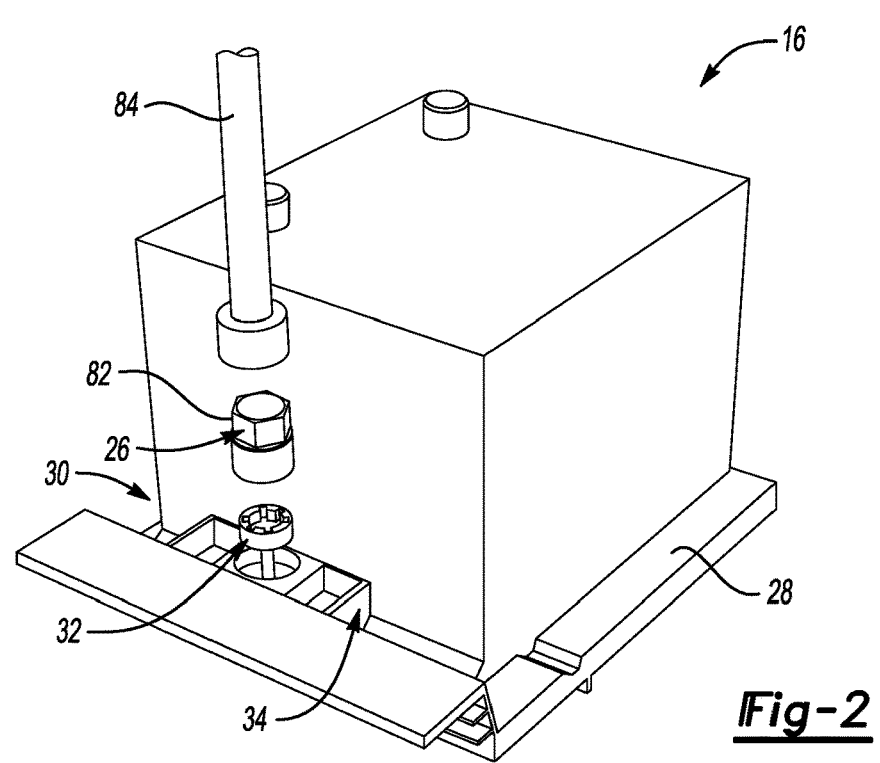
FIG. 2 is a top perspective view of an example vehicle battery relative to a clamp assembly.

An example locking lug nut key 26 configured to interface with the locking lug nut 24F is shown in FIG. 2. FIG. 2 also shows the battery 16 supported on a battery tray 28. The battery 16 is stabilized and held in place relative to the battery tray 28 using a clamp assembly 30, in this disclosure. The clamp assembly 30 is configured to selectively tighten and loosen relative to the battery 16. The clamp assembly 30 is configured to interface with the locking lug nut key 26. In particular, the clamp assembly 30 is not configured to interface with a standard socket or another type of standard interface. In this way, a user with access to the locking lug nut key 26 can readily access the battery 16, while those without access to the locking lug nut key 26 will have difficulty tightening or loosening the clamp assembly 30, and in turn will have difficulty obtaining access to the battery 16. Further, the user of the motor vehicle 10 can use the same locking lug nut key configured to interface with the locking lug nuts on the wheels of the motor vehicle 10 to access the battery 16, which increases convenience and reduces the number of components (i.e., keys) the user has to store and maintain (i.e., keep track of).

The term "key" is this disclosure is used to refer to specialized tools configured to interface with locking lug nuts and the clamp assembly 30 of the battery 16.

Figure 3:
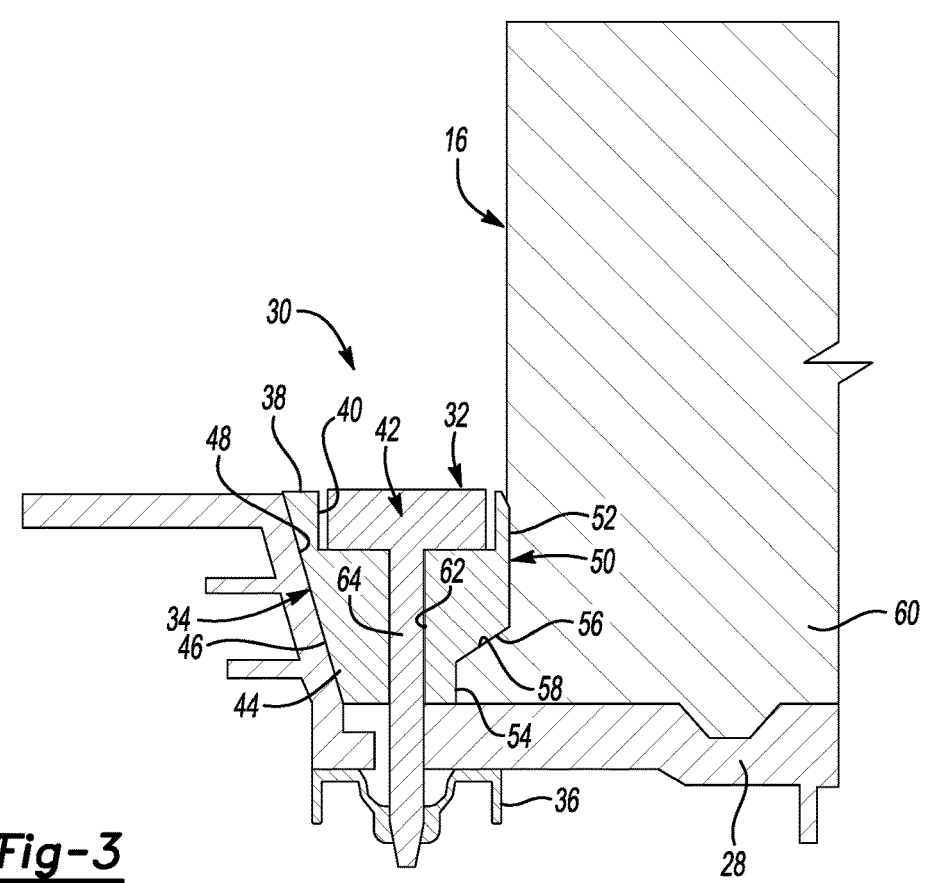
FIG. 3 is a cross-sectional view illustrating an example arrangement of the battery, battery tray, and clamp assembly.

With reference to FIGS. 2 and 3, the clamp assembly 30 includes a bolt 32, a first jaw 34, and a second jaw 36. The first jaw 34 and second jaw 36 are arranged on opposite sides of the battery tray 28. With reference to FIG. 3, for example, the first jaw 34 is above the battery tray 28 and the second jaw 36 is below the battery tray 28. The first and second jaws 34, 36 could be provided by plates or other structures configured to selectively increase or decrease the force applied to the battery 16.

The first jaw 34 includes a surface 38 opposite the battery tray 28 and second jaw 36. In the orientation of FIG. 3, the surface 38 is an upper surface. The surface 38 includes a recess 40 configured to receive a head 42 of the bolt 32. The recess 40 is wider than the head 42 of the bolt 32 in this example, to permit a portion of the locking lug nut key 26 to be inserted into the recess 40 laterally between the head 42 and the bolt 32. The recess 40 is configured to receive the head 42 of the bolt 32 such that the head 42 of the bolt 32 does not project beyond, and in particular vertically above, the surface 38, which increases the difficulty of accessing the head 42 unless one has access to the locking lug nut key 26.

The first jaw 34 further includes a main body section 44. Opposite the battery 16, the main body section 44 includes an inclined wall 46 configured to interface with a corresponding inclined wall 48 of the battery tray 28. Opposite the inclined wall 46, the main body section 44 includes a wall 50 having substantially vertical sections 52, 54 spaced-apart by inclined section 56. Inclined section 56 contacts a surface 58 of a projection 60 of the battery 16. The projection 60 of the battery 16 may be provided by an exterior housing of the battery 16. The projection 60 may alternatively be a separate component attached to the exterior housing of the battery 16. Regardless, in this disclosure, the projection 60 may be considered part of the battery 16. Surface 58 faces generally away from the battery tray 28 and second jaw 36, and in particular faces generally away from a surface of the battery tray 28 directly vertically beneath projection 60.

The first jaw 34 further includes a passageway 62 configured to permit a shank 64 of the bolt 32 to pass therethrough. The shank 64 may be partially or fully threaded. The shank 64 passes through the passageway 62, through the battery tray 28, and threadingly engages the second jaw 36. The second jaw 36 may be rotatably fixed to the battery tray 28, in some examples. The bolt 32 is rotated to selectively apply force to the first and second jaws 34, 36, and in turn rotation of the bolt 32 selectively causes the first jaw 34 to apply force to the projection 60 of the battery 16, thereby selectively stabilizing the battery 16 and holding the battery 16 in place.

Figures 4, 5:
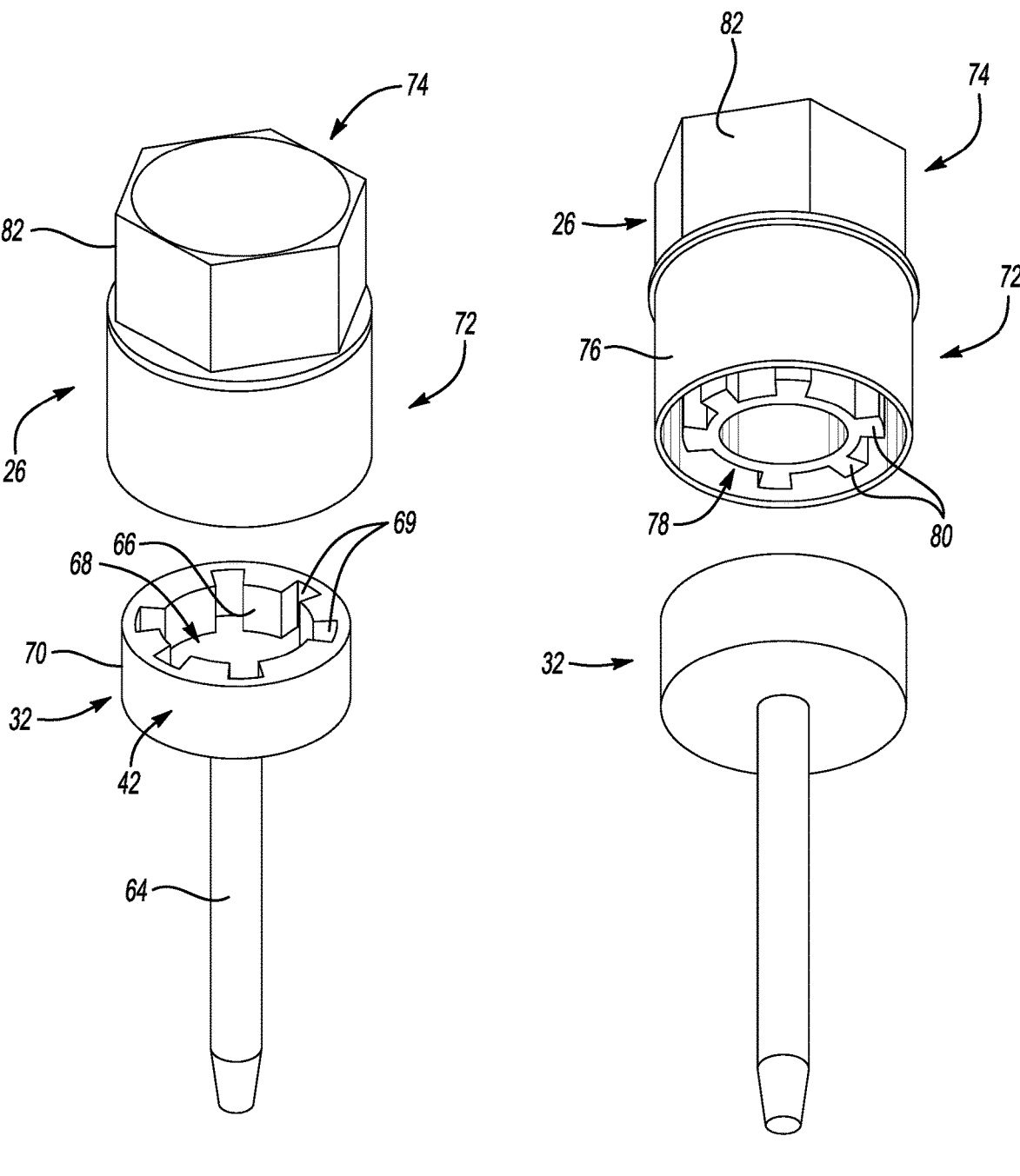
FIG. 4 is a view of an example bolt and an example locking lug nut key from a top perspective.
FIG. 5 is a view of an example bolt and an example locking lug nut key from a bottom perspective.

The locking lug nut key 26 and bolt 32 are shown in more detail in FIGS. 4 and 5. With joint reference to FIGS. 4 and 5, the head 42 of the bolt 32 includes an inner wall 66 providing a cavity 68. The inner wall 66 exhibits a pattern configured to interface with the locking lug nut key 26. The pattern of the inner wall 66 includes one or more of splines, grooves, notches, lobes, points, projections, and indentations to provide a unique pattern that is not configured to interface with standard tools. In an example, while the pattern may include some hexagonally-shaped components, the pattern is not merely provided by a hexagonal pattern. In other words, a standard socket or standard Allen wrench will not be able to interface with the pattern of the inner wall 66. In this example, the inner wall 66 includes a plurality of indentations 69 spaced-apart circumferentially about the inner wall 66. The indentations 69 are such that a standard tool cannot readily interface with the bolt 32. Further, an outer wall 70 of the head 42 of the bolt 32 is substantially circular in this example, which reduces likelihood it can interface with a standard tool.

The locking lug nut key 26 includes a first section 72 and a second section 74. The first section 72 includes a wall 76 sized and shaped to fit within recess 40 in the lateral space between the recess 40 and the head 42. Inside wall 76, the first section 72 includes a projection 78 configured to fit within cavity 68 and exhibiting a negative of the pattern of the inner wall 66. The projection 78 exhibits a complimentary negative of the pattern of the inner wall 66 such that projection 78 can be slidingly received within the cavity 68. The projection 78, in this example, includes a plurality of projections 80, each of which is configured to be slidingly received within a corresponding one of the indentations 69 as the projection 78 slides into the cavity 68.

The second section 74 exhibits an outer wall 82 configured to interface with a tool 84 (FIG. 2). The outer wall 82 may be a standard hexagonal profile configured to interface with standard tools. The tool 84 is representative of a standard tool, such as a wrench, breaker bar, etc. The tool 84 is also representative of a standard socket, which may be attached to a socket wrench, breaker bar, or drill. An extension may be provided between the tool 84 and a wrench, breaker bar, or drill, in some examples.

When the projection 78 of the locking lug nut key 26 projects into the cavity 68, the bolt 32 is configured to rotate with rotation of the locking lug nut key 26 to selectively tighten or loosen the clamp assembly 30, thereby selectively increasing or decreasing the force applied to the projection 60 of the battery 16, respectively.

In this example, while the bolt 32 includes a cavity 68 (i.e., a female part) configured to receive the projection 78 (i.e., a male part) of the locking lug nut key 26, it should be understood that the bolt 32 could include a male part and the locking lug nut key 26 could include a female part.

It should be understood that directional terms such as "bottom," "top," "forward," "rearward," "upward," "downward," etc., are used for purposes of explanation only and should not be deemed limiting. Further, it should be understood that terms such as "about," "substantially," and "generally" are not intended to be boundaryless terms, and should be interpreted consistent with the way one skilled in the art would interpret those terms. It should be understood that certain aspects of the disclosure are exaggerated in the Figures for purposes of illustration only.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a battery; and
a clamp assembly configured to hold the battery in place, wherein the clamp assembly is configured to interface with a locking lug nut key.

2. The motor vehicle as recited in claim 1, wherein the locking lug nut key is also configured to interface with a locking lug nut of the motor vehicle.

3. The motor vehicle as recited in claim 1, wherein:
the clamp assembly includes a bolt, and
a head of the bolt is configured to interface with the locking lug nut key.

4. The motor vehicle as recited in claim 3, wherein:
the head of the bolt includes an inner wall providing a cavity, and
the inner wall exhibits a pattern configured to interface with the locking lug nut key.

5. The motor vehicle as recited in claim 4, wherein the pattern of the inner wall includes one or more of splines, grooves, notches, lobes, points, projections, and indentations.

6. The motor vehicle as recited in claim 4, wherein an outer wall of the head of the bolt is substantially circular.

7. The motor vehicle as recited in claim 4, wherein:
the locking lug nut key includes a first section and a second section,
the first section includes a projection exhibiting a negative of the pattern,
the projection is configured to project into the cavity of the head of the bolt and to interface with the inner wall of the head of the bolt, and
when the projection projects into the cavity of the head of the bolt and interfaces with the inner wall of the head of the bolt, the bolt is configured to rotate with rotation of the locking lug nut key.

8. The motor vehicle as recited in claim 7, wherein an outer wall of the second section is configured to interface with a wrench.

9. The motor vehicle as recited in claim 7, wherein an outer wall of the second section is configured to interface with a standard socket.

10. The motor vehicle as recited in claim 3, wherein:
the clamp assembly also includes a first jaw and a second jaw, and
the bolt is configured to interface with the first jaw and the second jaw such that the clamp assembly selectively applies force to the battery.

11. The motor vehicle as recited in claim 10, wherein:
the battery includes a projection, and
the bolt is configured to interface with the first jaw and the second jaw to selectively apply force to the projection.

12. The motor vehicle as recited in claim 10, wherein:
the first jaw includes a recess in a surface facing away from the second jaw, and the recess is configured to receive the head of the bolt such that the head of the bolt does not project beyond the surface of the first jaw in a direction away from the second jaw.

13. The motor vehicle as recited in claim 10, wherein the second jaw is configured to contact a battery tray and is located on an opposite side of the battery tray as the first jaw.

14. The motor vehicle as recited in claim 1, wherein the battery is a 12 Volt battery.

15. A clamp assembly for holding a vehicle battery in place, comprising:
a first jaw;
a second jaw;
a bolt configured to interface with the first and second jaw and further configured to selectively tighten and loosen the clamp assembly, wherein the bolt is configured to interface with a locking lug nut key.

16. The clamp as recited in claim 15, wherein:
a head of the bolt includes an inner wall providing a cavity,
the inner wall exhibits a pattern configured to interface with the locking lug nut key
the locking lug nut key includes a projection exhibiting a negative of the pattern,
the projection is configured to project into the cavity of the head of the bolt and to interface with the inner wall of the head of the bolt, and
when the projection projects into the cavity of the head of the bolt and interfaces with the inner wall of the head of the bolt, the bolt is configured to rotate with rotation of the locking lug nut key.

17. A method, comprising:
tightening or loosening a clamp assembly using a locking lug nut key of a motor vehicle, wherein the clamp assembly is configured to hold a battery of the motor vehicle in place.

18. The method as recited in claim 17, wherein:
the clamp assembly includes a first jaw, a second jaw, and a bolt configured to selectively tighten and loosen the first jaw relative to the second jaw, and
the bolt is configured to interface with the locking lug nut key.

19. The method as recited in claim 18, wherein:
a head of the bolt includes an inner wall providing a cavity,
the inner wall exhibits a pattern configured to interface with the locking lug nut key,
the locking lug nut key includes a projection exhibiting a negative of the pattern,
the projection is configured to project into the cavity of the head of the bolt and to interface with the inner wall of the head of the bolt, and
the tightening or loosening step is performed when the projection projects into the cavity of the head of the bolt and interfaces with the inner wall of the head of the bolt.

20. The method as recited in claim 17, further comprising:
tightening or loosening a locking lug nut of the motor vehicle using the locking lug nut key.

* * * * *